(12) United States Patent
Wang

(10) Patent No.: US 10,499,624 B2
(45) Date of Patent: Dec. 10, 2019

(54) UNIAXIAL WINDING DEVICE

(71) Applicant: WEIHAI LANGBAO FISHING TACKLE CO., LTD., Weihai (CN)

(72) Inventor: Xi Ren Wang, Weihai (CN)

(73) Assignee: WEIHAI LANGBAO FISHING TACKEL CO., LTD., Weihai (CN)

( * ) Notice: Subject to any disclaimer, the term of this patent is extended or adjusted under 35 U.S.C. 154(b) by 0 days.

(21) Appl. No.: 16/022,735

(22) Filed: Jun. 29, 2018

(65) Prior Publication Data
US 2019/0000055 A1    Jan. 3, 2019

(30) Foreign Application Priority Data
Jun. 30, 2017   (CN) .................... 2017 2 0780495 U

(51) Int. Cl.
*A01K 89/01* (2006.01)
*A01K 89/00* (2006.01)
*A01K 89/015* (2006.01)

(52) U.S. Cl.
CPC ........ *A01K 89/0111* (2013.01); *A01K 89/003* (2013.01); *A01K 89/0192* (2015.05); *A01K 89/01931* (2015.05); *B65H 2701/31* (2013.01)

(58) Field of Classification Search
CPC ............... A01K 89/003; A01K 89/0111; A01K 89/0192; A01K 89/01931
See application file for complete search history.

(56) References Cited

U.S. PATENT DOCUMENTS

| | | | | |
|---|---|---|---|---|
| 2,727,702 A * | 12/1955 | Latincich | ............. | A01K 89/003 242/404.2 |
| 2,903,196 A * | 9/1959 | Fowler | ................. | A01K 89/003 242/388.7 |
| 3,026,059 A * | 3/1962 | Dennler | ............... | A01K 89/003 242/396.9 |
| 3,295,787 A * | 1/1967 | Golonka | .............. | A01K 89/003 242/129.8 |
| 3,951,354 A * | 4/1976 | Bagby | .................. | A01K 89/003 242/129.8 |
| 4,540,136 A * | 9/1985 | Rauch | .................. | A01K 89/003 242/150 R |
| 4,728,048 A * | 3/1988 | Batson | ................. | A01K 89/003 242/129.51 |
| 5,056,732 A * | 10/1991 | Nicholson, Jr. | ........ | A01K 89/00 242/470 |

(Continued)

FOREIGN PATENT DOCUMENTS

CN  205132772   4/2016
WO  WO-9309667 A1 *  5/1993  ........... A01K 89/003

*Primary Examiner* — Emmanuel M Marcelo
(74) *Attorney, Agent, or Firm* — JCIPRNET

(57) ABSTRACT

A uniaxial winding device having a main body, comprising a main shaft provided on an upper part of the main body, and a fixed seat provided on a lower part of the main body, wherein the upper part of the main shaft is provided with a tapered block and a fixing pin which limits the tapered block, wherein a spool and locknut are mounted on the main shaft on a first side of the tapered block, wherein a rocker arm which is able to rotate the main shaft is provided on a second side of the tapered block,
wherein a resistance adjusting mechanism is provided on the main shaft which can adjust the rotational resistance on the spool.

8 Claims, 3 Drawing Sheets

(56) References Cited

U.S. PATENT DOCUMENTS

| | | | | |
|---|---|---|---|---|
| 5,513,463 | A * | 5/1996 | Drinkwater | A01K 89/003 242/423.2 |
| 5,725,172 | A * | 3/1998 | Koehler | A01K 89/00 242/395 |
| 6,640,484 | B1 * | 11/2003 | Russow | A01K 89/003 43/25 |
| 6,742,737 | B1 * | 6/2004 | Conner | A01K 89/003 242/129.7 |
| 9,016,614 | B1 * | 4/2015 | Pouncil | A01K 89/003 242/566 |
| 2010/0325935 | A1 * | 12/2010 | Chen | A01K 89/003 43/25 |
| 2012/0205481 | A1 * | 8/2012 | Stout | B65H 49/32 242/423.1 |
| 2012/0261507 | A1 * | 10/2012 | Waldbauer | A01K 89/003 242/599 |
| 2017/0064933 | A1 * | 3/2017 | Tseng | A01K 89/003 |

* cited by examiner

UNIAXIAL WINDING DEVICE

CROSS-REFERENCE TO RELATED APPLICATIONS

This present application is based upon and claims the benefit of priority of the prior Chinese Utility Model Application No. 201720780495.3, filed on Jun. 30, 2017, the entire contents of which are incorporated herein by reference.

FIELD

The disclosure relates to a kind of winding device which can be used to wind a spool line onto a fishing reel or other object, or wind a line back to the spool from the fishing reel or other object.

BACKGROUND

Based on the type of fishing, a fishing line needs to be wound onto a fishing reel from a spool while fishing, and the line also can be wound from the fishing reel back to the spool to replace the fishing line on the fishing reel. In order to avoid the line tightening during take-up and pay-off after loading, the fishing line needs to be wound on the fishing reel under a certain pressure to keep the fishing line tension because there are lures, lead weight, fishes and other loads on the fishing line during fishing. For the sake of overcoming the low winding efficiency and uneven tensile force of manual work, Chinese Patent CN205132772 U discloses a kind of winding device, including a main body which is equipped with a pinion and an engaging gear wheel, a mounting shaft is mounted on the pinion, and a spool is mounted on the mounting shaft, the pinion can rotate the spool by being driven by the gear wheel; in addition, a resistance adjusting mechanism which is able to increase the frictional force on the pinion is also mounted on the main body. Despite the labor-saving transmission, the resistance adjustment mechanism has the following disadvantages when the winding device makes use of a gearwheel to drive the pinion: small and uneven frictional forces of the resistance adjusting mechanism, becomes easily worn out, and short service life. In addition, the fixed seat easily rotates when it is under a large force because the existing winding device is always fixed by a one-point supporting structure, and so it is unable to keep the stability of the winding device when being used.

SUMMARY

According to one embodiment, a uniaxial winding device having a main body a main shaft provided on an upper part of the main body, and a fixed seat provided on a lower part of the main body, wherein the upper part of the main shaft is provided with a tapered block and a fixing pin which limits the tapered block, wherein a spool and locknut are mounted on the main shaft on a first side of the tapered block, wherein a rocker arm which is able to rotate the main shaft is provided on a second side of the tapered block, wherein a resistance adjusting mechanism is provided on the main shaft which can adjust the rotational resistance on the spool.

DESCRIPTION OF EMBODIMENTS

Figure 1:
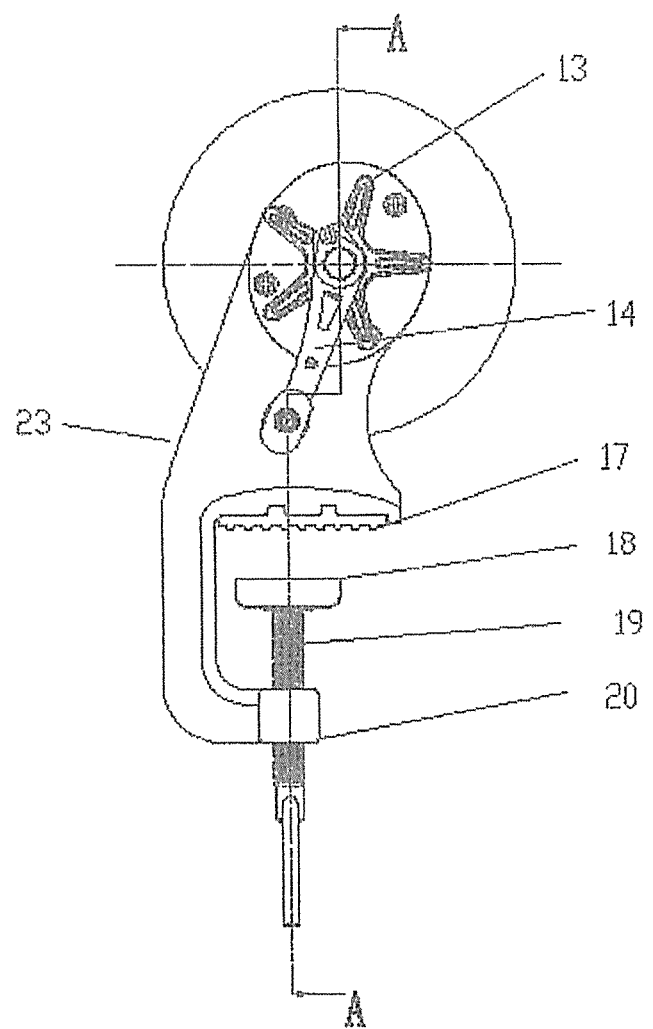
FIG. 1 is a schematic diagram of the embodiment.
Figure 2:
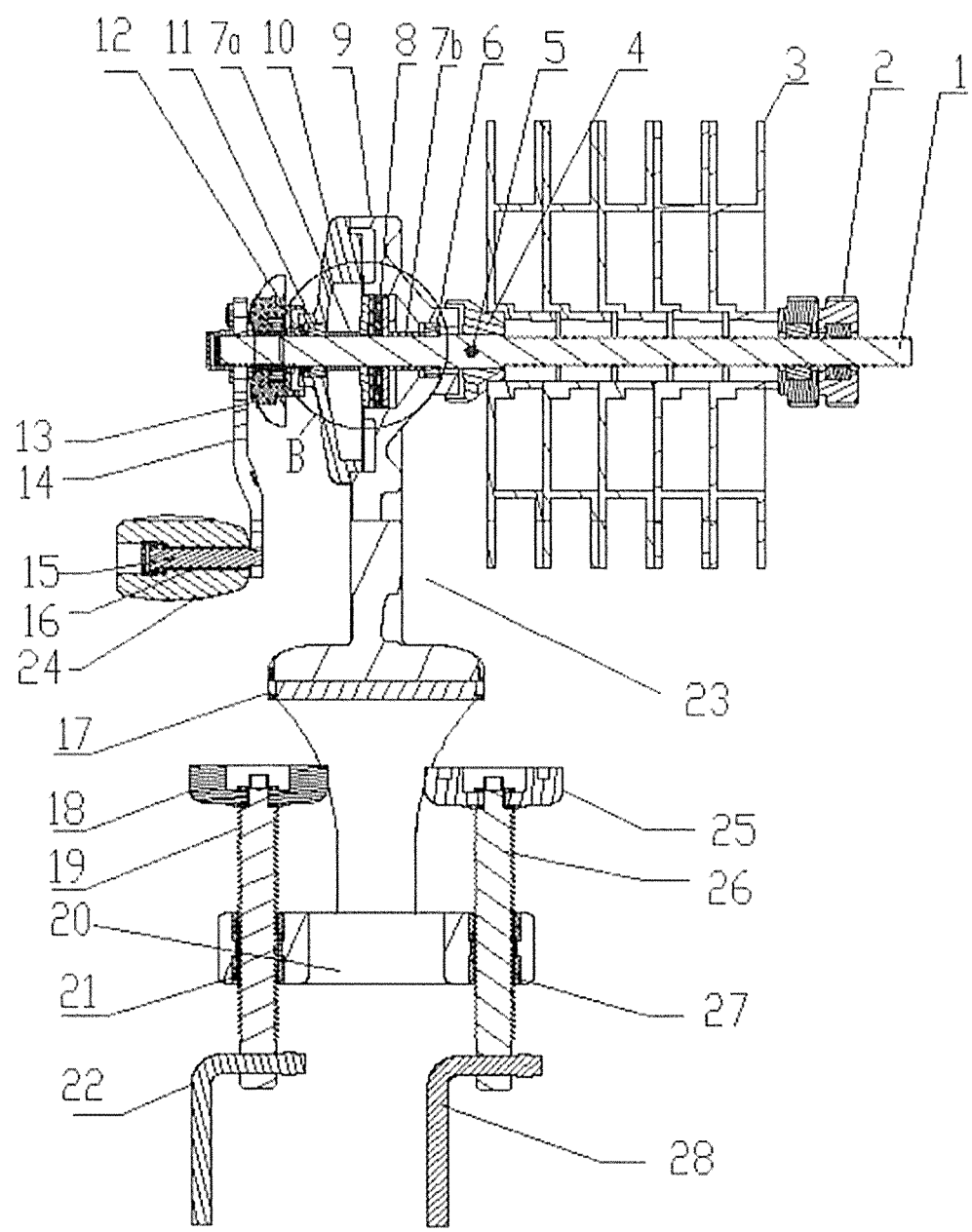
FIG. 2 is a cross-sectional view taken along line A-A of FIG. 1.
Figure 3:
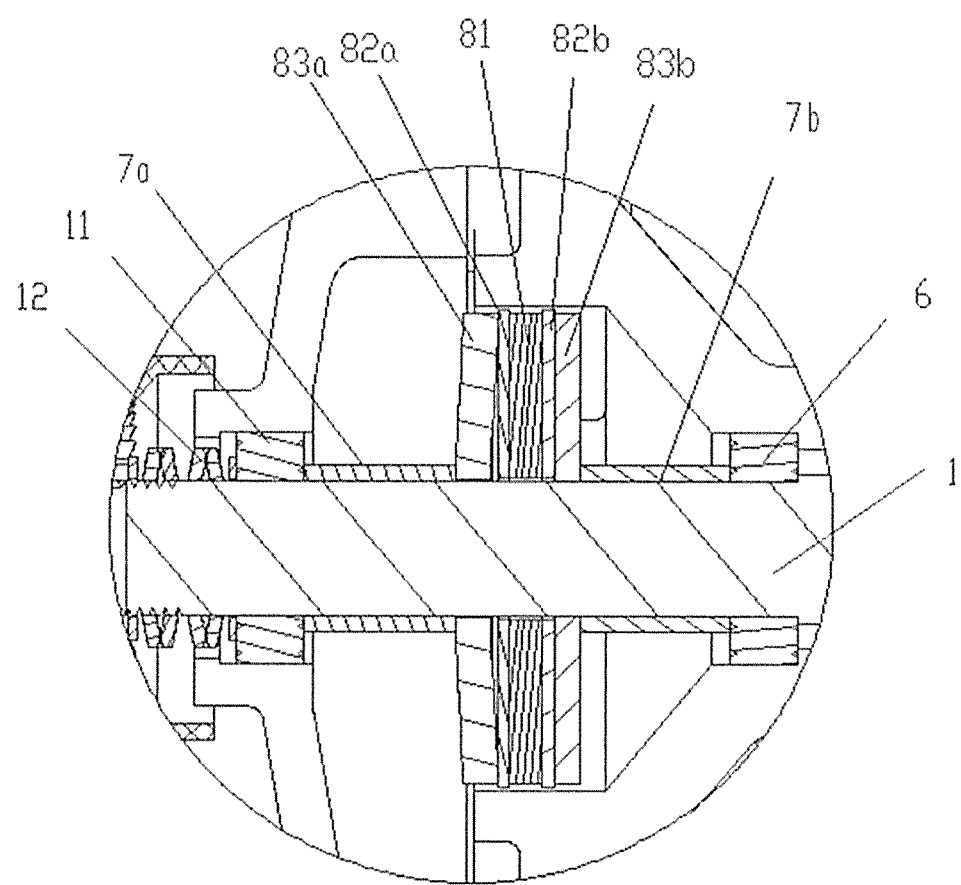
FIG. 3 is a partial enlarged view of part B in FIG. 1.

This disclosure discloses a kind of uniaxial winding device, including a main body 23 in which the upper part of the main body 23 is provided with a main shaft 1, and the lower part is provided with a fixed seat, wherein the main shaft 1 is provided with a tapered block 4 and a fixing pin 5 which limits the tapered block 4. On the main shaft 1 on one side of the tapered block 4, a spool 3 and locknut 2 are mounted. On the other side, a rocker arm 14 which can rotate the main shaft 1 is mounted. In addition, the main shaft 1 is further provided with a resistance adjusting mechanism which is used for adjusting the rotating resistance of the spool 3 or the tensile force of a fishing line on the main shaft 1. The fixed seat comprises a main body support pad 17, as well as a left support block 18 and a right supporting block 25 which are symmetrically disposed under the main body supporting pad 17. The upper end of the left support block 18 and the right support block 25 form clamping parts with the lower end of the main body support pad 17, the clamping parts enable the winding device to be secured (to a desk, plate and so on). The utility model has the following advantages, such as, simple structure, good transmission stability, even frictional forces and is able to be reliably secured.

In order to solve the above-mentioned technical problems, the embodiment has provided a kind of uniaxial winding device which has a simple structure, good transmission stability, even frictional force and is able to be reliably secured.

The uniaxial winding device of the embodiment, including the main body 23 in which the upper part of the main body 23 is provided with a main shaft 1, and the lower part is provided with a fixed seat, wherein the main shaft 1 is provided with a tapered block 4 and a fixing pin 5 which limits the tapered block 4. On the main shaft 1 on one side of the tapered block 4, the spool 3 and locknut 2 are mounted. On the other side, the rocker arm 14 which can rotate the main shaft 1 is mounted.

In addition, the main shaft 1 is further provided with the resistance adjusting mechanism provided on the main shaft 1, i.e. the resistance adjusting mechanism for adjusting the tensile force of the fishing line.

The resistance adjusting mechanism includes an adjusting handle 13, a saddle-shaped pad 12, limit casings 7a,7b, and at least one friction plate assembly 8 mounted on the main shaft 1. The above-mentioned friction plate assembly 8 includes dynamic friction plates 83a, 83b, friction plates 82a, 82b, and a static friction plate 81. The friction plates 82a, 82b are mounted on one side or two sides of the static friction plate 81. With regard to the friction plates 82a, 82b, there are dynamic friction plates 83a, 83b on each of the other sides. The limit casings 7a,7b are preferably mounted on the outside of the friction plate assembly 8. There may be one or more groups of the above-mentioned friction plate assembly 8; because the frictional force is able to be increased with more friction plates 82a, 82b, the tensile force value scope of the fishing line will be accordingly larger.

An assembly housing 9 is formed on the top of the main body 23. The outer surface of the assembly housing 9 is provided with a mounting stand for the tapered block 4, and an annular recess is provided on the internal surface for mounting a bearing. The assembly housing 9 and a side cover 10 which can seal the opening of assembly housing 9 will be connected with the main shaft 1 through bearing A 6 and bearing B 11. The limit casings 7 and friction plate assembly 8 are mounted between bearing A 6 and bearing B 11. The saddle-shaped pad 12 and adjusting handle 13 are mounted on the main shaft 1 on the outside of bearing B 11.

The above-mentioned fixed seat includes the main body support pad 17, the left support block 18 and the right support block 25 which are symmetrically provided below the main body support pad 17. On the bottom of the main body 23, a screw mount 20 is mounted, and the upper end of a left screw 19 and a right screw 26 will pass through a left thread casing 21 and a right thread casing 27 which are formed in the screw mount 20 to connect with the bottom of the left support block 18 and the right support block 25; moreover, the upper end of the left support block 18 and the right support block 25 will form clamping parts with the lower end of the main body support pad 17. The end of each of the screws is equipped with an L-shaped wrench 22,28, which is preferable for adjusting the gap between the left support block 18 as well as the right support block 25 and the main body support pad 17 when the screws are rotated. The above-mentioned left and right thread casings 21,27 are injection molded in the main body 23. A handle grip which is provided on the end of the rocker arm 14 is mainly composed of a shaft 15 which is riveted with the rocker arm 14, an inner sleeve 16 outside the shaft 15, and a handle 24 assembled on top of the inner sleeve 16.

The rocker arm 14 and the spool 3 of the embodiment are mounted on the same main shaft 1, and the rocker arm 14 can drive the main shaft 1 and rotate the spool 3. When the resistance adjusting mechanism is mounted on the main shaft 1, the spool will experience a rotation resistance, and the strip line on the spool 3 will be wound to the fishing reel or other object under a certain tensile force. Due to the good transmission stability, the uniaxial winding device can satisfy the requirements when a large tension line is wound. Meanwhile, the pedestal of the winding device will fix the winding device in two ways, namely, it increases the force bearing surface so that when the force is large, the winding device will not rotate and the stability of the winding device is enhanced.

The parts of the figures are labeled as follows: main shaft 1, locknut 2, spool 3, tapered block 4, fixing pin 5, bearing A 6, limit casings 7a, 7b, friction plate assembly 8, static friction plate 81, friction plates 82a, 82b, dynamic friction plates 83a, 83b, assembly housing 9, side cover 10, bearing B 11, saddle-shaped pad 12, adjusting handle 13, rocker arm 14, shaft 15, inner sleeve 16, main body support pad 17, left support block 18, left screw 19, screw mount 20, left thread casing 21, L-shaped wrenches 22, 28, main body 23, handle 24, right support block 25, right screw 26, right thread casing 27.

Specific Implementation Mode

This embodiment of the uniaxial winding device comprises a main body 23 in which the upper part of the main body 23 is provided with a main shaft 1, and the lower part is provided with a fixed seat, wherein the main shaft 1 is provided with a tapered block 4 and a fixing pin 5 which limits the tapered block 4, wherein a spool 3 and locknut 2 are mounted on one side of the main shaft 1 of the tapered block 4, and a rocker arm 14 which is able to rotate the main shaft 1 is mounted on the other side of the tapered block 4, wherein a resistance adjustment mechanism which is mounted on the main shaft 1 adjusts the rotating resistance of the spool 3, and wherein the winding device can operate the resistance adjustment mechanism so as to adjust the tensile force of a fishing line.

As a preferred embodiment, the fixed seat as specified in the example includes a main body support pad 17, a left support block 18 and a right support block 25 which are mounted below the main body support pad 17. The upper end of the left support block 18 and right support block 25 will form clamping parts with the lower end of the main body support pad 17, and the clamping parts enable the winding device to be secured (to a desk, plate and so on). The screw mount 20 is mounted on the bottom of main body 23, and a left thread casing 21 and a right thread casing 27 are provided on the screw mount 20, and the upper end of a left screw 19 and a right screw 26 can pass through the left thread casing 21 and right thread casing 27 to connect with the bottom of the left support block 18 and the right support block 25. With L-shaped wrenches 22, 28 on the end of each of the screws 19, 26, the gap between the left support block 18 and the combination of the main body 23 and the main body support pad 17 as well as the gap between the right support block 25 and the combination of the main body 23 and the main body support pad 17 will be adjusted by the rotation of the screws 19, 26. The left support block 18 and right support block 25 will not rotate freely during winding because they are secured to the fixture at two support points providing a stable structure.

As a preferred embodiment, the resistance adjusting mechanism is composed of an adjusting handle 13 which is mounted on the main shaft 1, a saddle-shaped pad 12, limit casings 7a,7b and a friction plate assembly 8. The above-mentioned friction plate assembly 8 consists of dynamic friction plates 83a, 83b, friction plates 82a, 82b and a static friction plate 81. In this example, the friction plates 82a and 82b are mounted on either side of the static friction plate 81. On the other side of each of the friction plates 82a and 82b, the dynamic friction plates 83a and 83b are provided. The limit casings 7a,7b are provided on the outside of the dynamic friction plates 83a and 83b and act to limit and transfer forces. When the winding device has low tensile force requirements for the fishing line, the friction plate assembly need only include the static friction plate 81, one friction plate 82a provided on one side of the static friction plate 81 and one dynamic friction plate 83a (or static friction plate 81, friction plate 82b and dynamic friction plate 83b). In order to satisfy the increasingly larger adjusting scope requirements of a fishing line's tensile force value, two or more groups of friction plate assemblies can be provided. Meanwhile, the assembly housing 9 is formed on the upper side of the main body 23. The outer surface of the assembly housing 9 is provided with a mounting stand for the tapered block 4, and an annular recess is formed on the internal surface for mounting a bearing. The assembly housing 9 and the side cover which can seal the opening of the assembly housing 9 will be connected with the main shaft 1 through bearing A 6 and bearing B 11. The limit casings 7a,7b and friction plate assembly 8 are mounted between bearing A 6 and bearing B 11. A saddle-shaped pad 12 and adjusting handle 13 are mounted on the main shaft 1 on the outside of bearing B 11. In order to protect the various friction plate assembly 8 components, the friction plate assembly 8 and bearings 6, 11 shall be provided in the cavity which is formed by the side cover 10 and the assembly housing 9. One of the tapered block 4 is in contact with the assembly housing 9, and the other end is in contact with the spool 3 which is mounted on the main shaft 1. For this setup, tighten the locknut 2 which is mounted on the outside of the spool 3, and then a friction force will be generated between the spool 3 and the tapered block 4 as well as the locknut 2 causing the spool 3 to rotate with the tapered block 4, the locknut 2, and the main shaft 1 as a whole within a certain force range.

In another embodiment the rocker arm 14 is equipped with a handle grip which is composed of a shaft 15 which is riveted with the rocker arm 14, an inner sleeve 16 which is provided on the outside of the shaft 15, and a handle 24 which is provided on top of the inner sleeve 16.

Methods for operating the embodiment are shown as follows. First method, when the line of the spool 3 is being wrapped around the fishing reel or other object, the adjusting handle 13 is screwed down, and a force is applied to the saddle-shaped pad 12 to elastically deform the saddle-shaped pad 12. The force is transferred to the dynamic friction plate 83a, friction plate 82a, static friction plate 81, friction plate 82b and dynamic friction plate 83b. In this case, the static friction plate 81 will make use of friction plates 82a and 82b to provide frictional forces for the dynamic friction plates 83a and 83b; in other words, the dynamic friction plates 83a and 83b will be subjected to a resistance (the resistance when the spool 3 is rotated) to wrap the line of spool 3 around the fishing reel or other object under a certain tensile force. Second method, when the line of fishing reel or other object is being wound around the spool 3, the adjusting handle 13 is unscrewed, and the friction plates 83a and 83b do not apply a force to the dynamic friction plates 83a and 83b. At this moment, the dynamic friction plates 83a and 83b are able to rotate freely. The rocker arm 14 is manually driven and drives the main shaft 1 causing the spool 3 to rotate causing the line of the fishing reel or other object to be wound around the spool 3.

What is claimed is:

1. A uniaxial winding device having a main body, comprising:
   a main shaft provided on an upper part of the main body, and
   a fixed seat provided on a lower part of the main body,
   wherein an upper part of the main shaft is provided with a tapered block and a fixing pin which limits the tapered block,
   wherein a spool and a locknut are mounted on the main shaft on a first side of the tapered block,
   wherein a rocker arm which is able to rotate the main shaft is provided on a second side of the tapered block,
   wherein a resistance adjusting mechanism is directly provided on the main shaft which can adjust a rotational resistance on the spool.

2. The uniaxial winding device according to claim 1, wherein the fixed seat comprises:
   a main body support pad,
   a left support block,
   a right support block, and
   a screw mount,
   wherein the left support block and the right support block are symmetrically provided below the main body support pad,
   wherein the screw mount is provided on a bottom of the main body,
   wherein the screw mount has a left thread casing and a right thread casing,
   wherein a left screw is passed through the left thread casing and a right screw is passed through the right thread casing,
   wherein an upper end of the left screw is connected with a bottom of the left support block, and an upper end of the right screw is connected with a bottom of the right support block,
   wherein an upper end of the left support block and an upper end of the right support block are situated across from the main body support pad creating a gap, and
   wherein the left and right screws are able to be rotated so as to adjust the gap creating a clamping part.

3. The uniaxial winding device according to claim 2, wherein an L-shaped wrench is provided on an end of each of the left and right screws.

4. The uniaxial winding device according to claim 2, wherein the left thread casing and the right thread casing are injection molded on the main body.

5. The uniaxial winding device according to claim 1, wherein the resistance adjusting mechanism comprises:
   an adjusting handle,
   a saddle-shaped pad,
   a first limit casing,
   a second limit casing, and
   at least one friction plate assembly,
   wherein the at least one friction plate assembly includes at least one dynamic friction plate, at least one friction plate, and a static friction plate,
   wherein in the at least one friction plate assembly the at least one friction plate is provided on one or two sides of the static friction plate,
   wherein the at least one dynamic friction plate is on the opposite side of the at least one friction plate from that of the static friction plate, and
   wherein at least one of the limit casings is provided on the outside of the at least one friction plate assembly.

6. The uniaxial winding device according to claim 5, wherein there are more than one friction plate assemblies.

7. The uniaxial winding device according to claim 5, wherein the upper part of the main body forms an assembly housing having an outer surface and an internal surface, wherein a mounting stand for the tapered block is provided on the outer surface, wherein an annular recess is provided on the internal surface for mounting a first bearing, wherein a side cover is provided for sealing an opening of the assembly housing, wherein the assembly housing is connected to the main shaft via the first bearing, wherein the side cover is connected to the main shaft via a second bearing, wherein the first limit casing, the at least one friction plate assembly, and the second limit casing are disposed between the first bearing and the second bearing on the main shaft, and wherein the saddle-shaped pad and the adjusting handle are provided on the main shaft on the opposite side of the second bearing from the second limit casing.

8. The uniaxial winding device according to claim 1, wherein a handle grip is provided on an end of the rocker arm, and the handle grip comprises a shaft riveted with the rocker arm, an inner sleeve provided on the outer surface of the shaft, and a handle provided on the inner sleeve.

* * * * *